United States Patent
Chen et al.

(10) Patent No.: US 8,428,122 B2
(45) Date of Patent: Apr. 23, 2013

(54) METHOD AND SYSTEM FOR FRAME BUFFER COMPRESSION AND MEMORY RESOURCE REDUCTION FOR 3D VIDEO

(75) Inventors: Xuemin Chen, Rancho Santa Fe, CA (US); Marcus Kellerman, San Diego, CA (US); Samir Hulyalkar, Newtown, PA (US); Ilya Klebanov, Thornhill (CA)

(73) Assignee: Broadcom Corporation, Irvine, CA (US)

(*) Notice: Subject to any disclaimer, the term of this patent is extended or adjusted under 35 U.S.C. 154(b) by 606 days.

(21) Appl. No.: 12/560,554

(22) Filed: Sep. 16, 2009

(65) Prior Publication Data

US 2011/0063414 A1    Mar. 17, 2011

(51) Int. Cl.
*H04N 7/12*    (2006.01)
*H04N 11/02*    (2006.01)

(52) U.S. Cl.
USPC .................................................. 375/240.01

(58) Field of Classification Search .............. 375/240.16
See application file for complete search history.

(56) References Cited

U.S. PATENT DOCUMENTS

| | | | | |
|---|---|---|---|---|
| 5,652,616 | A * | 7/1997 | Chen et al. | 348/43 |
| 6,356,309 | B1 * | 3/2002 | Masaki et al. | 348/439.1 |
| 2002/0009137 | A1 * | 1/2002 | Nelson et al. | 375/240.1 |
| 2007/0064800 | A1 * | 3/2007 | Ha | 375/240.12 |
| 2008/0159384 | A1 * | 7/2008 | Civanlar et al. | 375/240.01 |
| 2010/0165083 | A1 | 7/2010 | Sasaki et al. | |

FOREIGN PATENT DOCUMENTS

| | | |
|---|---|---|
| EP | 0817493 | 1/1998 |
| WO | 2005/069630 | 7/2005 |

OTHER PUBLICATIONS

Search Report for EP 10009408.5-2223/2302939 mailed Apr. 12, 2012.

Zhang, et al., "Rate-Distoriation Optimized Frame Dropping Based on Dynamic Frame Concealment", Fifth IEEE International Symposium on Embedded Computing, 2008, pp. 129-134.

* cited by examiner

*Primary Examiner* — Mark Rinehart
*Assistant Examiner* — Maharishi Khirodhar
(74) *Attorney, Agent, or Firm* — Thomas | Horstemeyer, LLP

(57) ABSTRACT

A video receiver receives a compressed 3D video comprising a base view video and a residual view video from a video transmitter. The video receiver decodes the received base view video and an enhancement view video of the received compressed 3D video into a left view video and a right view video. Base view pictures are generated selectively based on available memory resource. The residual view video is generated by subtracting base view pictures from corresponding enhancement view pictures. The received base view and residual view videos are buffered for video decoding. Pictures in the buffered residual view video are added to corresponding pictures in the buffered base view video for enhancement view decoding. The left view video and/or the right view video are generated from the resulting decoded base view and enhancement view pictures. A motion vector used for a disparity predicted macroblock is applied to adjacent macroblock pre-fetching.

18 Claims, 8 Drawing Sheets

METHOD AND SYSTEM FOR FRAME BUFFER COMPRESSION AND MEMORY RESOURCE REDUCTION FOR 3D VIDEO

CROSS-REFERENCE TO RELATED APPLICATIONS/INCORPORATION BY REFERENCE

This application makes reference to:
U.S. application Ser. No. 12/554,416 entitled "Method and system for processing 2D/3D video" and filed on Sep. 4, 2009;
U.S. application Ser. No. 12/546,644 entitled "Method and system for converting a 3D video with targeted advertisement into a 2D video for display" and filed on Aug.24, 2009;
U.S. Provisional Application Ser. No. 61/242,644 entitled "Method and system for rendering 3D graphics based on 3D display capabilities" and filed on Sep. 15, 2009;
U.S. application Ser. No. 12/545,679 entitled "Method and system for asymmetrical rate control for 3D video compression" and filed on Aug. 21, 2009;
U.S. application Ser. No. 12/560,578 entitled "Method and system for watermarking 3D content" and filed on Sep. 16, 2009; and
U.S. application Ser. No. 12/560,592 entitled "Method and system for protecting 3D video content" and filed on Sep. 16, 2009.

Each of the above stated applications is hereby incorporated herein by reference in its entirety.

FIELD OF THE INVENTION

Certain embodiments of the invention relate to video processing. More specifically, certain embodiments of the invention relate to a method and system for frame buffer compression and memory resource reduction for 3D video.

BACKGROUND OF THE INVENTION

Digital video capabilities may be incorporated into a wide range of devices such as, for example, digital televisions, digital direct broadcast systems, digital recording devices, and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV, a 3D video is often desirable because it is often more realistic to viewers than the 2D counterpart. A 3D video comprises a left view video and a right view video. A 3D video frame may be produced by combining left view video components and right view video components, respectively.

Various video encoding standards, for example, MPEG-1, MPEG-2, MPEG-4, H.263, and H.264/AVC, have been established for encoding digital video sequences in a compressed manner. A frame in a compressed video may be coded in three possible modes: I-picture, P-picture, and B-picture. Compressed video frames may be divided into groups of pictures (GOPs). For example, each GOP comprises one I-picture, several P-pictures and/or several B-pictures.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for frame buffer compression and memory resource reduction for 3D video, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a method and/or system for frame buffer compression and memory resource reduction for 3D video. In various embodiments of the invention, a video receiver may be operable to receive a compressed 3D video from a video transmitter. The received compressed 3D video may comprise a base view video and a residual view video. The video receiver may be operable to decode the received base view video and an enhancement view video of the received compressed 3D video into a left view video and a right view video. Pictures in the base view video may be generated selectively based on, for example, available memory resource comprising memory bandwidth and size. In an exemplary embodiment of the invention, the VTU 200 may be operable to drop and/or skip one or more base view pictures that are not used to predict corresponding enhancement view pictures based on the available memory resource. The video transmitter may be operable to generate the residual view video by subtracting pictures in the base view video from corresponding pictures in the enhancement view video of the compressed 3D video. The received base view video and the received residual view video may be buffered. The buffered base view video may be decoded generating the left view video and/or the right view video. Pictures in the buffered residual view video may be added to corresponding pictures in the buffered base view video producing pictures in the enhancement view video. The produced pictures in the enhancement view video may be decoded generating the left view video and/or the right view video. A motion vector is used for fetching a macroblock of a picture in the left view video for motion prediction for a corresponding disparity predicted macroblock of a picture in the right view video. With regard to motion-disparity compensation, due to a high correlation between the left view video and right view video, the motion vector may also be applied to pre-fetching adjacent macroblocks of the picture in the left view video for motion prediction for corresponding adjacent macroblocks of the corresponding disparity predicted macroblock of the picture in the right view video.

Figure 1:
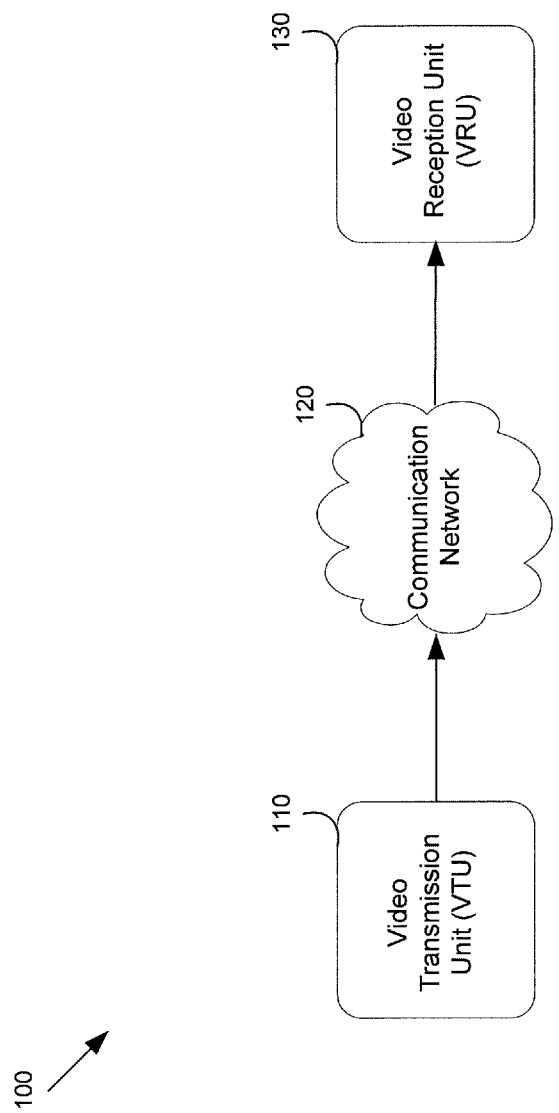
FIG. 1 is a block diagram of an exemplary video coding system that is operable to perform frame buffer compression and memory resource reduction for 3D video, in accordance with an embodiment of the invention.

FIG. 1 is a block diagram of an exemplary video coding system that is operable to perform frame buffer compression and memory resource reduction for 3D video, in accordance with an embodiment of the invention. Referring to FIG. 1, there is shown a video transmission unit (VTU) 110, a communication network 120 and a video reception unit (VRU) 130.

The VTU 110 may comprise suitable logic, circuitry, interfaces and/or code that may be operable to provide compressed video content to the VRU 130. The VTU 110 may be operable to acquire an uncompressed 3D video and perform video compression on the acquired uncompressed 3D video. The VTU 110 may be operable to use, for example, MPEG-4 Multi-view Video Coding (MVC) standard to compress the acquired uncompressed 3D video into two coding views, namely, a base view and an enhancement view. Each coding view comprises a plurality of layered compressed pictures for transmission. Compressed pictures in the base view and enhancement view may be provided to the VRU 130 via the communication network 120.

Due to the high correlation between the base view and the enhancement view, reference compressed pictures in the enhancement view may be predicted from the corresponding base view compressed pictures. In this regard, the VTU 110 may be operable to selectively generate and/or store compressed pictures so as to reduce memory resource, namely memory bandwidth and size, for 3D video coding. For example, base view pictures that may be used to predict corresponding enhancement view pictures may be generated and stored. The VTU 110 may be operable to drop and/or skip one or more base view pictures that may not be referenced by corresponding enhancement view pictures. Furthermore, residual view pictures between the base view and the enhancement view may be generated by subtracting compressed pictures in the base view from corresponding compressed pictures in the enhancement view. The compressed pictures in the base view and the generated residual view pictures may be buffered, respectively. The buffered compressed pictures in the base view and the buffered residual view pictures may be multiplexed into a single transport stream for transmission.

In order to improve overall coding efficiency, the VTU 110 may be operable to perform global motion-disparity estimation for the acquired uncompressed 3D video. A macroblock may be used as a basic unit in the global motion-disparity estimation. In instances where, for the acquired uncompressed 3D video, a particular macroblock of an uncompressed picture in the right view video may be disparity predicted from a specific macroblock of an uncompressed picture in the left view video. Due to a high correlation between the left view video and the right view video of the acquired uncompressed 3D video, it is very likely that one or more adjacent macroblocks of the particular macroblock of the uncompressed picture in the right view video may be disparity predicted from corresponding one or more adjacent macroblocks of the specific macroblock of the uncompressed picture in the left view video. In this regard, a disparity prediction speculation may be applied to pre-fetch adjacent macroblocks so as to reduce the number of burst access to video memory. For example, in instances where a motion vector applied to the particular macroblock of the uncompressed picture in the right view video may be used to fetch the specific macroblock of the uncompressed picture in the left view video for motion prediction, the same motion vector may be applied to adjacent macroblocks of the particular macroblock in the right view video to pre-fetch corresponding adjacent macroblocks of the specific macroblock of the uncompressed picture in the left view video for motion prediction.

The communication network 120 may comprise suitable logic, circuitry, interfaces and/or code that may be operable to provide platforms for communication between the VTU 110 and the VRU 130. The communication network 120 may be implemented as a wired or wireless communication network. The communication network 120 may be local area network, wide area network, the Internet, and the like.

The VRU 130 may comprise suitable logic, circuitry, interfaces and/or code that may be operable to receive a transport stream from the VTU 110 over the communication network 120. The received transport stream may comprise base view pictures and residual view pictures of a compressed 3D video. The received base view pictures and residual view pictures may be stored for video decoding. The VRU 130 may be operable to use, for example, MPEG-4 MVC standard, to decode the compressed 3D video into a left view video and a right video view of corresponding decoded 3D video. In this regard, the VRU 130 may be operable to decode the stored base view pictures into, for example, the left view video. Stored residual view pictures may be added to corresponding stored base view pictures to reproduce associated enhancement view pictures. The VRU 130 may be operable to decode the reproduced enhancement view pictures, for example, into the right view video. The left view and right view videos may be composed to be displayed to users.

The VRU 130 may be operable to perform motion-disparity compensation so as to improve video quality of the decoded 3D video. Due to a high dependency between the left view video and the right view video of the decoded 3D video, a disparity prediction speculation may be applied to pre-fetch adjacent macroblocks in the motion-disparity compensation. For example, a motion vector, which is used to fetch a specific macroblock of an uncompressed picture in the left view video for motion prediction for a particular macroblock of an uncompressed picture in the right view video, may be also applied to pre-fetching adjacent macroblocks in the left view video for motion prediction for corresponding adjacent macroblocks in the right view video. Examples of the VRU 130 may comprise, for example, set-top boxes, personal computers, and the like.

In an exemplary operation, the VTU 110 may be operable to acquire an uncompressed 3D video comprising a left view video and a right view video. The uncompressed 3D video may be compressed picture-by-picture into two coding views, namely, a base view and an enhancement view. Each coding view may comprise a plurality of layered compressed pictures. Based on available memory resource, one or more base view pictures that may not be used to predict corresponding enhancement view pictures and may be dropped and/or skipped to reduce memory resource for 3D video coding. Residual view pictures between the base view and the enhancement view may be generated by subtracting base view pictures from corresponding enhancement view pictures. The base view pictures and the generated residual view pictures may be buffered, respectively, for transmission. The buffered base view pictures and the buffered residual view pictures may be multiplexed into a single transport stream to be communicated to the VRU 130. The VRU 130 may be operable to demultiplex the transport stream received from the VTU 110. The resulting base view pictures and residual view pictures may be stored for video decoding. The VRU 130 may be operable to decode the stored base view pictures into, for example, a left view video. The stored residual view pictures may be added to corresponding stored base view pictures to reproduce associated enhancement view pictures. The reproduced enhancement view pictures may be compressed into, for example, a right view video. The resulting left view and right view videos may be composed to be presented to users.

In instances where motion-disparity estimation-compensation may be supported, the VTU 110 and the VRU 130 may be operable to perform motion-disparity estimation and motion-disparity compensation, respectively, to improve video quality. In this regard, due to a high correlation between the left view and right view videos, a motion vector, which may be used to fetch a specific macroblock in the left view video for motion prediction for a corresponding particular parity predicted macroblock in the right view video, may be applied to adjacent macroblocks of the specific macroblock in the left view video for motion prediction for corresponding adjacent macroblocks of the particular parity predicted macroblock in the right view video.

Figure 2:
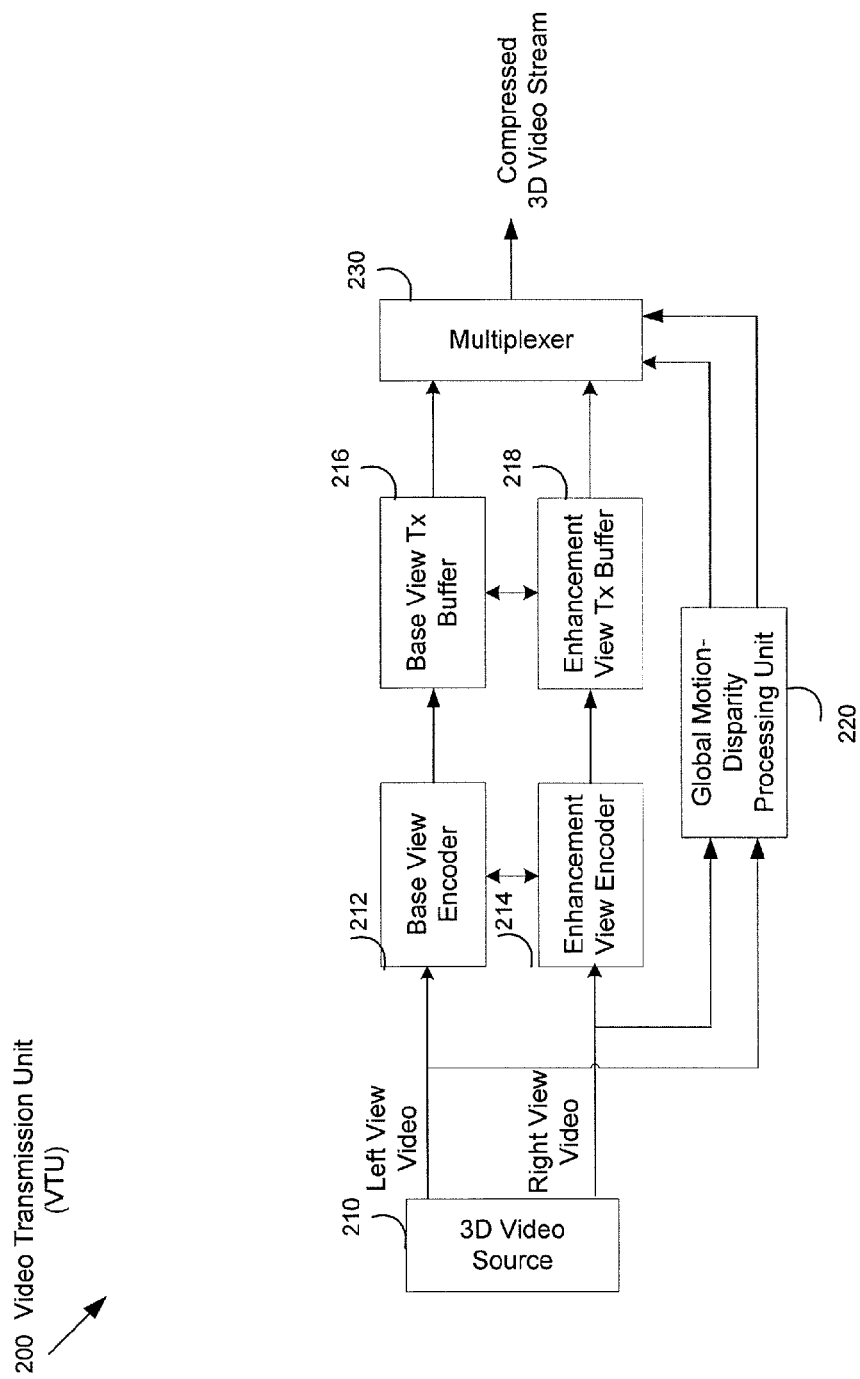
FIG. 2 is a diagram illustrating an exemplary video transmission unit that is operable to compress a frame buffer and reduce memory resource for 3D video, in accordance with an embodiment of the invention.

FIG. 2 is a diagram illustrating an exemplary video transmission unit that is operable to compress a frame buffer and reduce memory resource for 3D video, in accordance with an embodiment of the invention. Referring to FIG. 2, there is shown a video transmission unit (VTU) 200. The VTU comprises a 3D video source 210, a base view encoder 212, an enhancement view encoder 214, a base view transmit (Tx) buffer 216, an enhancement view transmit (Tx) buffer 218, a global motion-disparity processing unit 220 and a multiplexer 220.

The 3D video source 210 may comprise suitable logic, circuitry, interfaces and/or code that may be operable to capture uncompressed 3D video contents. A 3D video comprises a left view video and a right view video. A 3D video picture may be formed by combining left view video components and right view video components. The 3D video source 210 may be operable to communicate uncompressed 3D video pictures with a video encoder such as the base view encoder 212 and the enhancement view encoder 214 for video compressing. The uncompressed 3D video pictures may be compressed into two coding views, namely, a base view and an enhancement view, by using MPEG-4 Multi-view Video Coding (MVC) standard. Each coding view may comprise a plurality of layered compressed pictures.

The base view encoder 214 may comprise suitable logic, circuitry, interfaces and/or code that may be operable to encode, for example, the left view video from the 3D video source 210 picture-by-picture into a base view stream. In this regard, the base view encoder 214 may be operable to selectively generate and/or store pictures in the base view video to reduce memory resource for 3D video coding. For example, the base view encoder 214 may be operable to generate and store base view pictures that may be referenced to predict corresponding reference pictures in the enhancement view video. One or more base view pictures that may not be used to predict corresponding enhancement view pictures may be dropped and/or skipped. The base view encoder 214 may be operable to utilize various video compression algorithms such as specified in MPEG-4, AVC, VC1, VP6, and/or other video formats to form compressed or coded video contents for the left view video from the 3D video source 210. Information such as the scene information from base view coding may be communicated with the enhancement view encoder 216 for enhancement view coding.

The enhancement view encoder 216 may comprise suitable logic, circuitry, interfaces and/or code that may be operable to encode, for example, the right view video from the 3D video source 210 picture-by-picture into an enhancement view stream. The enhancement view encoder 216 may be operable to utilize various video compression algorithms such as specified in MPEG-4, AVC, VC1, VP6, and/or other video formats to form compressed or coded video content for the right view video from the 3D video source 210. The enhancement view coding may be correlated to the base view coding using the scene information from the base view coding. In this regard, the enhancement view encoder 216 may be operable to utilize one or more generated base view pictures to predict corresponding enhancement view pictures. Residual view pictures of the resulting predicted enhancement view pictures may be stored for transmission so as to compress transmission frame buffer.

The base view Tx buffer 216 and the enhancement view Tx buffer 218 may comprise suitable logic, circuitry, interfaces and/or code that may be operable to buffer or store compressed base view pictures from the base view encoder 214 and residual view pictures between the base view stream and the enhancement stream, respectively. The base view Tx buffer 216 and the enhancement view Tx buffer 218 may operate in a first-in-first-out basis. The base view Tx buffer 216 and the enhancement view Tx buffer 218 may be operable to manage the buffered pictures so as to be transmitted in an intended frame rate based on, for example, QoS of targeted programs.

The global motion-disparity processing unit 220 may comprise suitable logic, circuitry, interfaces and/or code that may be operable to perform global motion and/or disparity estimation. Disparity estimation (DE) is the process of determining the local translations needed to align different regions in two pictures. Global motion is used to describe coherent component of motions of different constituent parts of an object, by a parameterized motion model. Global Motion Estimation (GME) is the process of estimating these parameters of the parameterized motion model. The global motion-disparity processing unit 220 may be operable to perform global motion estimation and/or disparity estimation on macroblocks of corresponding uncompressed pictures. For example, a particular macroblock of a picture in the right view video may be disparity predicted from a specific macroblock of a picture in the left view video. Due to a high correlation between the left view video and the right view video of the uncompressed 3D video, a disparity prediction speculation may be implemented to pre-fetch adjacent macroblocks for motion compensation so as to reduce the number of burst access to memory. In this regard, a motion vector, which may be used to fetch the specific macroblock of the picture in the left view video for motion compensation for the particular macroblock of the picture in the right view video, may be applied to one or more adjacent macroblocks of the specific macroblock of the picture in the left view video for motion compensation for corresponding one or more adjacent macroblocks of the particular macroblock of the picture in the right view video. The global motion-disparity processing unit 220 may be operable to calculate motion vectors and disparity vectors to be communicated with the multiplexer 230 for transmission.

The multiplexer 230 may comprise suitable logic, circuitry, interfaces and/or code that may be operable to merge compressed video streams and other side information such as motion vectors and/or disparity vectors into a single transport stream (TS) for transmission. The compressed video streams may comprise compressed base view video and residual view video, respectively.

In an exemplary operation, the 3D video source 210 may be operable to capture an uncompressed 3D video, which comprises a left view video and a right view video. The uncompressed 3D video may be compressed into a base view video and an enhancement view video using MPEG-4 MVC standard, for example. Uncompressed pictures in the left view video and in the right view video may be compressed or coded via the base view encoder 212 and the enhancement view encoder 214, respectively. The base view encoder 212 may be operable to drop and/or skip one or more base view pictures that may not be used to predict corresponding enhancement view pictures so as to reduce memory resource for 3D video coding. Base view and residual view pictures may be buffered in the base view Tx buffer 216 and the enhancement view Tx buffer 218, respectively, for transmission. The multiplexer 230 may be operable to generate a transport stream by multiplexing video streams from the base view Tx buffer 216 and the enhancement view Tx buffer 218 with other side information such as motion vectors and/or disparity vectors provided by the global motion-disparity processing unit 220. The generated transport stream may be transmitted to the VRU 130 via the communication network 120.

Figure 3:
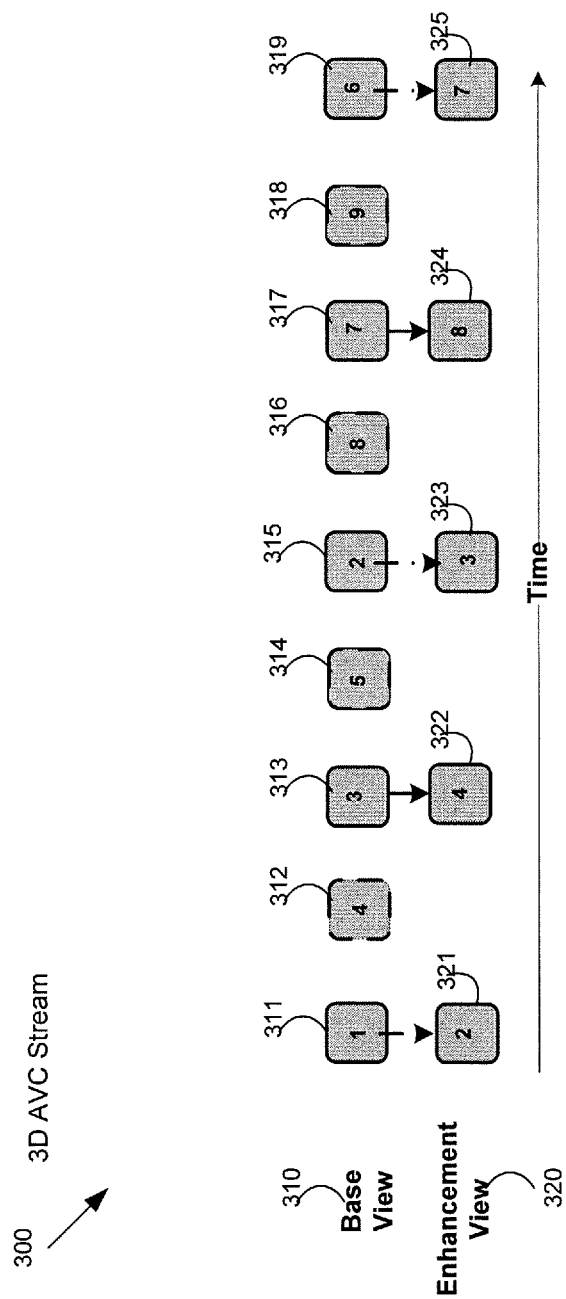
FIG. 3 is a diagram illustrating an exemplary independently decodable 3D AVC stream that may be buffered in a compressed frame buffer for transmission, in accordance with an embodiment of the invention.

FIG. 3 is a diagram illustrating an exemplary independently decodable 3D AVC stream that may be buffered in a compressed frame buffer for transmission, in accordance with an embodiment of the invention. Referring to FIG. 3, there is shown a 3D AVC stream 300. The 3D AVC stream 300 comprises a base view video stream 310 and an enhancement view video stream 320, which are generated or produced using MPEG-4 MVC standard via the base view encoder 212 and the enhancement view encoder 214, respectively. The base view video stream 310 comprises a plurality of pictures, of which, pictures 311-319 are illustrated. The enhancement view video stream 320 comprises a plurality of pictures, of which, pictures 321-325 are illustrated. Pictures in the 3D AVC stream 300 may be generated in the order of assigned coding order. For example, the picture 311 with the coding order of 1 may be generated first via the base view encoder 212. The picture 315 and the picture 321, which have a coding order of 2, may be generated successively to the picture 311 via the base view encoder 212 and the enhancement view encoder 214, respectively. One or more base view pictures such as, for example, the pictures 312, 314, 316 and/or 318, that are not used to predict corresponding enhancement view pictures may be dropped and/or skipped so as to reduce memory resource for 3D video coding. The base view video stream 310 may be buffered into the base view Tx buffer 216 for transmission. The enhancement view video stream 320 may not be transmitted to the VRU 130. Instead, residual view pictures may be generated for transmission. A residual view picture for a particular picture in the enhancement view video stream 320 may be generated by subtracting a corresponding picture in the base view video stream 310 from the particular picture in the enhancement view video stream 320. Residual view pictures of the enhancement view video stream 320 may be buffered in the enhancement view Tx buffer 218 for transmission.

Figure 4:
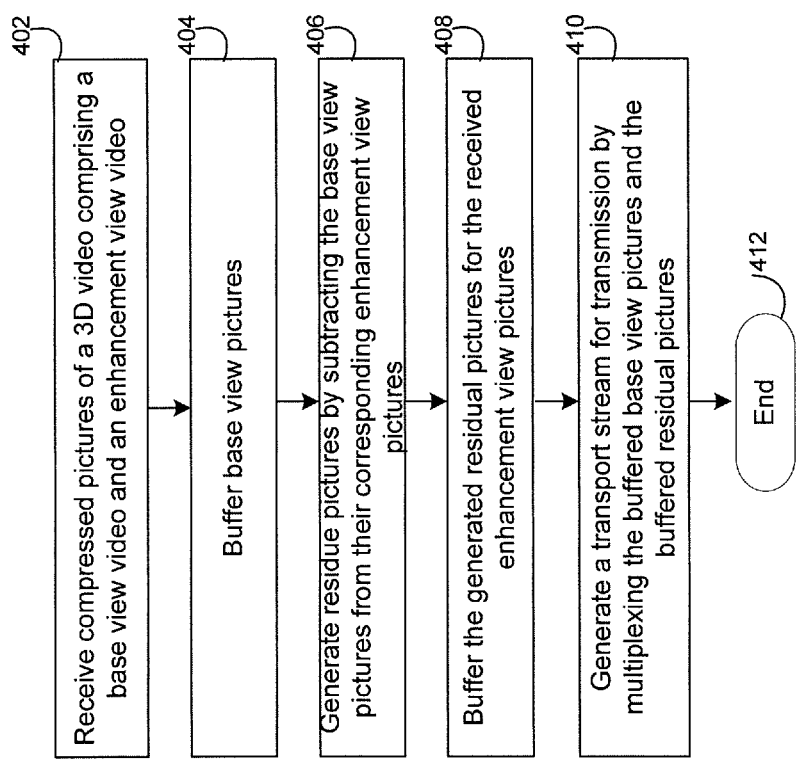
FIG. 4 is a flow chart illustrating exemplary steps that are utilized to compress a frame buffer for 3D video transmission, in accordance with an embodiment of the invention.

FIG. 4 is a flow chart illustrating exemplary steps that are utilized to compress a frame buffer for 3D video transmission, in accordance with an embodiment of the invention. Referring to FIG. 4, the exemplary steps start with step 402, where compressed pictures of a 3D video may comprise a base view and an enhancement view, which are received from the base view encoder 212 and the enhancement view encoder 214, respectively. In step 404, the base view pictures may be buffered in the base view Tx buffer 216 for transmission. In step 406, for each enhancement view picture, a residual view picture may be generated by subtracting a corresponding base view picture. In step 408, the generated residual view pictures may be buffered in the enhancement view Tx buffer 218 for transmission. In step 410, the multiplexer 230 may be operable to multiplex the base view pictures from the base view Tx buffer 216 and the residual view pictures from the enhancement view Tx buffer 218 to generate a transport stream for transmission. The exemplary steps may end at step 412.

Figure 5:
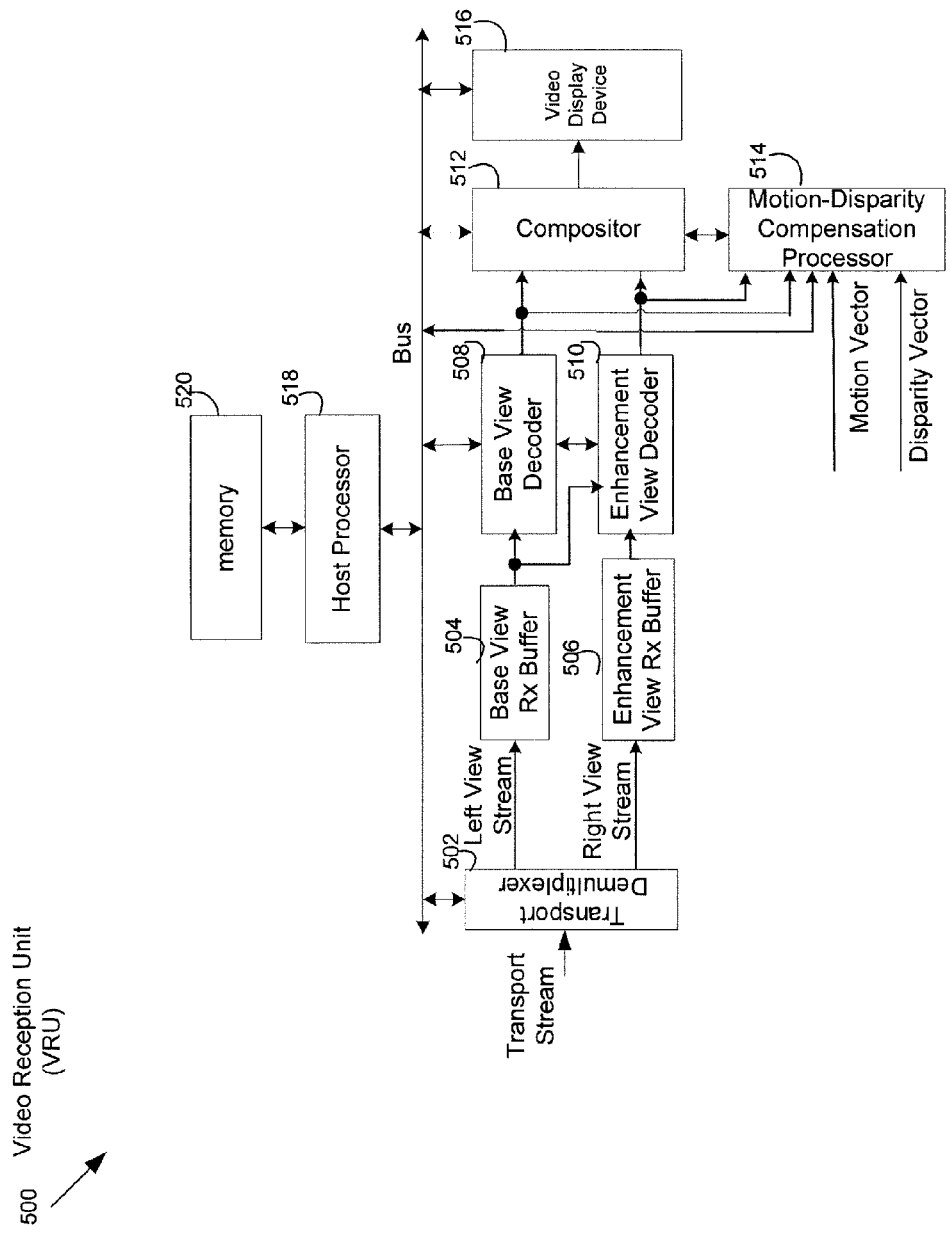
FIG. 5 is a diagram illustrating an exemplary video reception unit that is operable to support frame buffer compression and memory resource reduction for 3D video, in accordance with an embodiment of the invention.

FIG. 5 is a diagram illustrating an exemplary video reception unit that is operable to support frame buffer compression and memory resource reduction for 3D video, in accordance with an embodiment of the invention. Referring to FIG. 5, there is shown a video reception unit (VRU) 500. The VRU 500 comprises a transport demultiplexer 502, a base view Rx buffer 504, an enhancement view Rx buffer 506, a base view decoder 508, an enhancement view decoder 510, a compositor 512, a motion-disparity compensation processor 514, a video display device 516, a host processor 518 and a memory 520.

The transport demultiplexer 502 may comprise suitable logic, circuitry, interfaces and/or code that may be operable to demultiplex or parse a transport stream received from the VTU 110, for example. The received transport stream is a compound stream comprising a plurality of streams such as, for example, a base view stream, a residual view video stream, and other side information such as, for example, motion and parity estimation information of a 3D video. The transport demultiplexer 502 may be operable to extract the base view stream and the residual view video stream from the received transport stream. Pictures of the extracted base view stream may be buffered in the base view Rx buffer 504. Residual view pictures of the extracted residual view video stream may be buffered in the enhancement view Rx buffer 506.

The base view Rx buffer 504 and the enhancement view Rx buffer 506 may comprise suitable logic, circuitry, interfaces and/or code that may be operable to buffer or store the extracted base view compressed pictures and the extracted residual view pictures, respectively. The base view Rx buffer 504 and the enhancement view Rx buffer 506 may operate in a first-in-first-out basis. The base view Rx buffer 504 and the enhancement view Rx buffer 506 may be operable to manage the buffered compressed pictures so as to be transmitted in an intended frame rate based on, for example, QoS of targeted programs.

The base view decoder 508 may comprise suitable logic, circuitry, interfaces and/or code that may be operable to decode a received base view video from the VTU 110 frame by frame into, for example, a left view video of a 3D video.

The base view decoder 508 may be operable to utilize various video decompression algorithms such as specified in MPEG-4, AVC, VC1, VP6, and/or other video formats to form decompressed or decoded base view video contents. Information such as the scene information from base view decoding may be communicated with the enhancement view decoder 510 to be used for enhancement view decoding.

The enhancement view decoder 510 may comprise suitable logic, circuitry, interfaces and/or code that may be operable to decode an enhancement view video from the VTU 110 frame by frame into, for example, a right view video of the 3D video. The enhancement view decoder 510 may be operable to use residual view pictures in the enhancement view Rx buffer 506 and corresponding base view pictures in the base view Rx buffer 504 for enhancement decoding. For example, the enhancement view decoder 510 may be operable to add pictures in the buffered residual stream to corresponding pictures in the buffered base view stream reproducing pictures in an associated enhancement view stream. The enhancement view decoder 510 may be operable to decode pictures of the reproduced enhancement view stream into, for example, decoded pictures in a right view of the 3D video. Various video decompression algorithms such as specified in MPEG-4, AVC, VC1, VP6, and/or other video formats may be utilized to form decompressed or decoded enhancement view video contents. The resulting left view and right view videos may be communicated with the composer 512 to produce 3D pictures for display.

The compositor 512 may comprise suitable logic, circuitry, interfaces and/or code that may be operable to combine left view and right view pictures into 3D pictures for display. The left view and right view pictures may be motion-disparity compensated via the motion-disparity compensation processor 514. The compositor 512 may be operable to present the 3D pictures to a user via the video display device 516.

The motion-disparity compensation processor 514 may comprise suitable logic, circuitry, interfaces and/or code that may be operable to perform global motion and/or disparity compensation for left view and right view pictures of the 3D video. For example, a particular macroblock of a picture in the right view video may be disparity predicted from a specific macroblock of a picture in the left view video. Due to a high correlation between the left view video and the right view video of the 3D video, a disparity prediction speculation may be implemented to pre-fetch adjacent macroblocks for motion compensation to reduce the number of burst access to memory. A motion vector may be used to fetch the specific macroblock of the picture in the left view video for motion compensation for the particular macroblock of the picture in the right view video. The same motion vector may be applied to one or more adjacent macroblocks of the specific macroblock of the picture in the left view video for motion compensation for corresponding one or more adjacent macroblocks of the particular macroblock of the picture in the right view video.

The video display device 516 may comprise suitable logic, circuitry, and/or code that may be operable to display 3D video pictures received from the compositor 512.

The host processor 518 may comprise suitable logic, circuitry, interfaces and/or code that may be operable to manipulate and control operations of associated units such as, for example, the transport demultiplexer 502 and/or the motion-disparity compensation processor 514, for example, to support various applications such as, for example, 3D video streaming on the VRU 500.

The memory 520 may comprise suitable logic, circuitry, interfaces and/or code that may be operable to store information such as executable instructions and data that may be utilized by the VRU 500. The executable instructions may comprise various image processing functions that may be utilized to process decoded video contents by the base view decoder 508 and the enhancement view decoder 510. The executable instructions may comprise motion-disparity compensation algorithms that may be utilized by the motion-disparity compensation processor 514 to perform motion-disparity compensation. The data may comprise received transport stream data and decoded video contents. The memory 520 may comprise RAM, ROM, low latency non-volatile memory such as flash memory and/or other suitable electronic data storage.

In operation, the transport demultiplexer 502 may be operable to receive a transport stream from the VTU 110, for example. The received transport stream comprises video streams such as a base view stream, a residual view stream and other side information of a 3D video. The received side information may comprise associated motion vectors and disparity vectors. The transport demultiplexer 502 may be operable to demultiplex or parse the received transport stream into the base view stream, the residual view stream, and the associated motion vectors and disparity vectors. The base view stream and the residual view stream may be extracted for video decoding. In this regard, the extracted base view stream and the residual view stream may be buffered in the base view Rx buffer 504 and the enhancement view Rx buffer 506, respectively. The base view decoder 508 may be operable to decode the buffered base view stream into, for example, a left view stream of corresponding decoded 3D video. The enhancement view decoder 510 may be operable to add pictures in the buffered residual stream to corresponding pictures in the buffered base view stream reproducing pictures in an associated enhancement view stream. The reproduced enhancement view stream may be decoded into, for example, a right view video of the decoded 3D video. The left view and right view videos may be processed via the motion-disparity compensation processor 514 for a high video quality. In this regard, the motion-disparity compensation processor 514 may be operable to perform global motion and/or disparity compensation on a plurality of macroblocks of decoded pictures in the left view and right view videos of the decoded 3D video. In instances where a particular macroblock of a picture in the right view video may be disparity predicted from a specific macroblock of a picture in the left view video. A motion vector of the specific macroblock of the picture in the left view video may be used to fetch one or more associated adjacent macroblocks for motion compensation for corresponding one or more adjacent macroblocks of the particular macroblock of the picture in the right view video. The motion-disparity compensated left view and right view pictures may be combined to form corresponding 3D pictures for display on the video display device 516.

Figure 6:
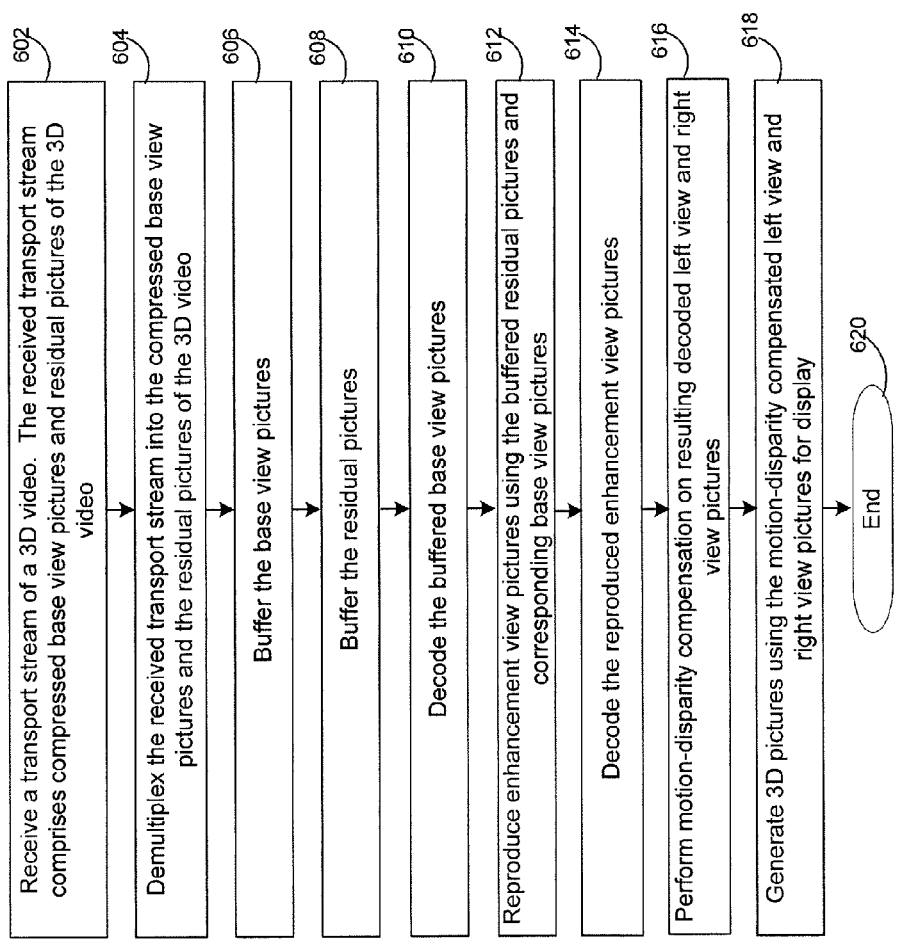
FIG. 6 is a flow chart illustrating exemplary steps that are utilized to process a compressed 3D video using a compressed frame buffer, in accordance with an embodiment of the invention.

FIG. 6 is a flow chart illustrating exemplary steps that are utilized to process a compressed 3D video using a compressed frame buffer, in accordance with an embodiment of the invention. Referring to FIG. 6, the exemplary steps start with step 602, where the transport demultiplexer 502 may be operable to receive a transport stream of a compressed 3D video. The received transport stream comprises compressed base view pictures and residual view pictures of the compressed 3D video. In step 604, the transport demultiplexer 502 may be operable to demultiplex or parse the received transport stream into the compressed base view pictures and the residual view pictures of the compressed 3D video. In step 606, the compressed base view pictures may be extracted and buffered in the base view Rx buffer 504. In step 608, the residual view pictures may be extracted and buffered in the enhancement view Rx buffer 506. In step 610, the base view decoder 508 may be operable to decode the buffered base view pictures, for example, into left view pictures of corresponding decoded 3D video. In step 612, the buffered residual view pictures may be added to corresponding base view pictures to reproduce associated enhancement view pictures. In step 614, the enhancement view decoder 510 may be operable to decode the reproduced enhancement view pictures, for example, into right view pictures of corresponding decoded 3D video. In step 616, the motion-disparity compensation processor 514 may be operable to perform motion-disparity compensation on the decoded pictures in the left view and right view videos. In step 618, the compositor 512 may be operable to generate 3D pictures using the motion-disparity compensated left view and right view pictures for display. The exemplary steps end at step 620.

Figure 7:
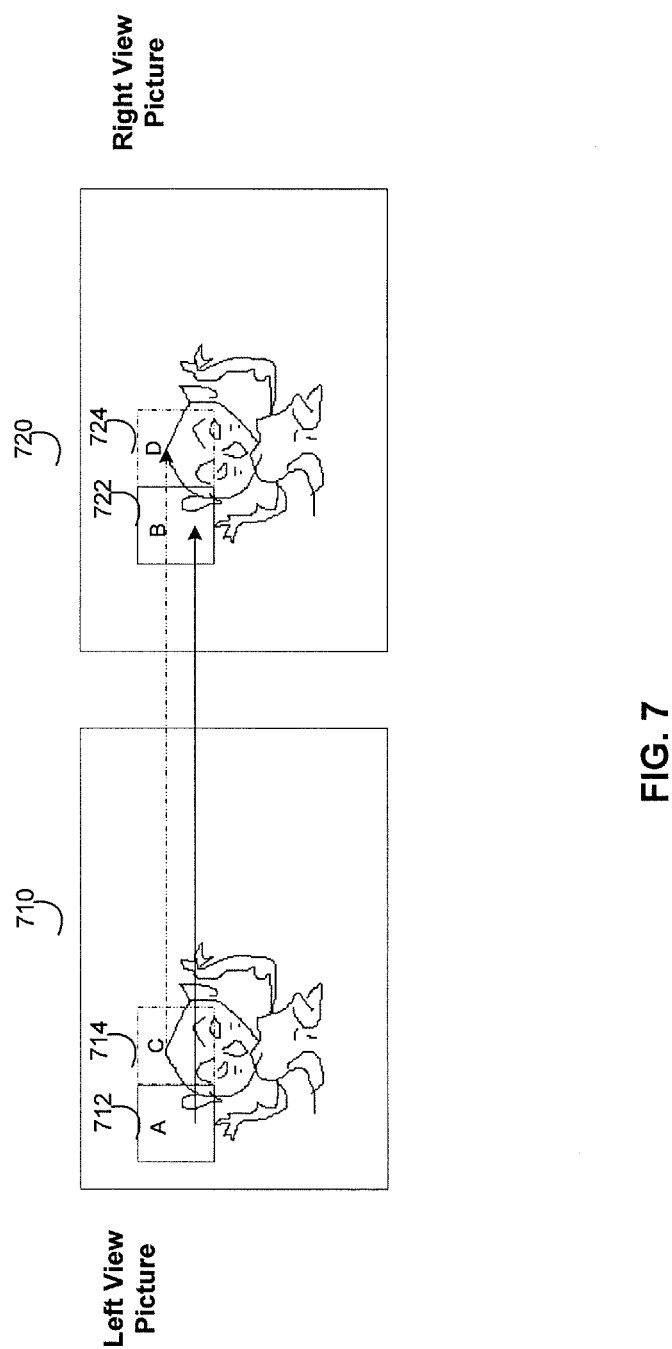
FIG. 7 is a diagram illustrating an exemplary disparity prediction with reduced memory resource for a 3D video, in accordance with an embodiment of the invention.

FIG. 7 is a diagram illustrating an exemplary disparity prediction with reduced memory resource for a 3D video, in accordance with an embodiment of the invention. Referring to FIG. 7, there is shown a left view picture 710 and a right view picture 720 of a 3D video. The 3D video may be an uncompressed source 3D video or a decoded 3D video. The left view picture 710 may comprise a plurality of macroblocks, of which macroblocks 712 and 714 are illustrated. The macroblock 714 is an adjacent macroblock of the macroblock 712. The right view picture 720 may comprise a plurality of macroblocks, of which macroblocks 722 and 724 are illustrated. The macroblock 724 is an adjacent macroblock of the macroblock 722. In instances where the macroblock 722 in the right view picture 720 may be disparity predicted from the macroblock 712 in the left view video 710. Due to a high correlation of the left view picture 710 and the right view picture 720, one or more adjacent macroblocks of the macroblock 722, for example, the macroblock 724 is very likely disparity predicted from the corresponding adjacent macroblock of the macroblock 712, for example, the macroblock 714. In this regard, a disparity prediction speculation may be applied to pre-fetch adjacent macroblocks for motion estimation or motion compensation so as to reduce the number of burst access to video memory. For example, in instances where a motion vector may be used to fetch the macroblock 712 in the left view 710 for motion prediction for the macroblock 722 in the right view video 720. The same motion vector may be applied to pre-fetch adjacent macroblocks, for example, the macroblock 714, of the macroblock 712 in the left view video 710 for motion prediction for corresponding adjacent macroblocks, for example, the macroblock 724, of the macroblock 722 in the right view video.

Figure 8:
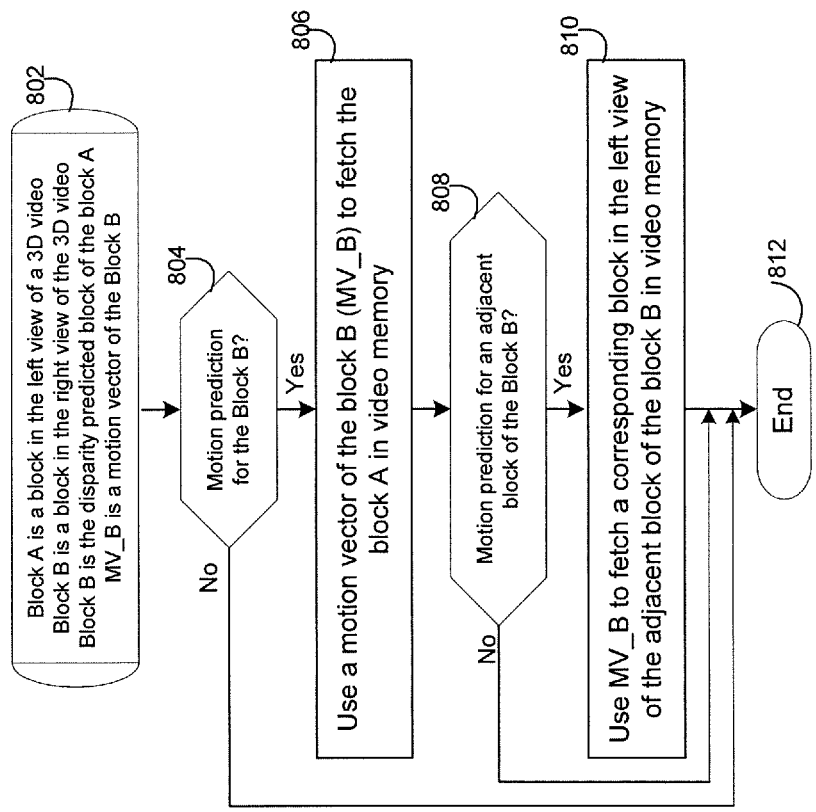
FIG. 8 is a flow chart illustrating exemplary steps that are utilized to perform a disparity prediction with reduced memory resource for a 3D video, in accordance with an embodiment of the invention.

FIG. 8 is a flow chart illustrating exemplary steps that are utilized to perform a disparity prediction with reduced memory resource for a 3D video, in accordance with an embodiment of the invention. Referring to FIG. 8, the exemplary steps start with step 802, where block A is a macroblock in the left view of a 3D video. Block B is a macroblock in the right view of the 3D video. The block B is the disparity predicted block of the block A. Parameter MV_B is a motion vector of the block B. In step 804, it may be determined if motion prediction may be needed for the block B. In instances where motion prediction may be needed for the block B, then in step 806, MV_B may be used to fetch the block A in video memory for motion prediction for the block B. In step 808, it may be determined if motion prediction may be needed for an adjacent macroblock of the block B. In instances where motion prediction may be needed for an adjacent macroblock of the block B, then in step 810, MV_B may be used to fetch a corresponding macroblock in the left view with respect to the adjacent block of the block B in video memory. The exemplary steps end at step 812.

In step 804, in instances where motion prediction may not be needed for the block B, then the exemplary steps may end at step 812.

In step 808, in instances where motion prediction may not be needed for an adjacent macroblock of the block B, then the exemplary steps may end at step 812.

Aspects of a method and system for frame buffer compression and memory resource reduction for 3D video are provided. In accordance with various embodiments of the invention, the VRU 500 may be operable to receive a compressed 3D video from the VTU 200. The received compressed 3D video may comprise a base view video and a residual view video. The VRU 500 may be operable to decode the received base view video and an enhancement view video of the received compressed 3D video into a left view video and a right view video. The base view video may be generated by selectively producing base view pictures based on available memory resource. For example, the VTU 200 may be operable to drop and/or skip one or more base view pictures that are not used to predict corresponding enhancement view pictures based on the available memory resource. The VTU 200 may be operable to generate the residual view video by subtracting pictures in the base view video from corresponding pictures in the enhancement view video of the compressed 3D video. The received base view video and the received residual view video may be buffered in the base view Rx buffer 504 and the enhancement view Rx buffer 506, respectively. The buffered base view video may be decoded via the base view decoder 508. The left view video and/or the right view video may be generated using the resulting decoded base view video. The enhancement view decoder 510 may be operable to add pictures in the buffered residual view video to corresponding pictures in the buffered base view video generating pictures in the enhancement view video. The produced pictures in the enhancement view video may be decoded via the enhancement view decoder 510. The resulting decoded pictures may be used to generate the left view video and/or the right view video. The VRU 500 may be operable to perform motion-disparity compensation for a higher video quality. In this regard, the VRU 500 may be operable to use a motion vector for fetching a macroblock of a picture in the left view video for motion prediction for a macroblock of a picture in the right view video. The macroblock of the picture in the right view video may be disparity predicted from the macroblock of the picture in the left view video for motion prediction. Due to a high correlation between the left view video and the right view video, the same motion vector may be used to pre-fetch one or more adjacent macroblocks of the picture in the left view video for motion prediction for corresponding one or more adjacent macroblocks of the macroblock of the picture in the right view video.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for frame buffer compression and memory resource reduction for 3D video.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    performing by one or more processors, one or more circuits, or any combination thereof in a video processing system:
        receiving compressed three-dimensional (3D) video comprising a base view video and a residual view video; and
        decoding said received base view video and an enhancement view video of said received compressed 3D video into a left view video and a right view video, wherein said base view video is generated by selectively producing pictures in said base view video based on available memory resource,
        wherein one or more pictures in said base view video that are not used to predict corresponding pictures in said enhancement view video are dropped based on said available memory resource.

2. The method according to claim 1, wherein said residual view video is generated by subtracting pictures in said base view video from corresponding pictures in said enhancement view video of said compressed 3D video.

3. The method according to claim 1, comprising buffering said received base view video and said received residual view video.

4. The method according to claim 3, comprising decoding said buffered base view video into said left view video, said right view, or both left and right view videos.

5. The method according to claim 3, comprising producing pictures in said enhancement view video of said received compressed 3D video by adding pictures in said buffered residual view video to corresponding pictures in said buffered base view video.

6. The method according to claim 5, comprising decoding said produced pictures in said enhancement view video into said left view video, said right view video, or both left and right view videos.

7. The method according to claim 1, comprising using a motion vector to fetch a macroblock of a picture in said left view video for motion prediction for a macroblock of a picture in said right view video, wherein said macroblock of said picture in said right view video is disparity predicted from said macroblock of a picture in said left view video.

8. The method according to claim 7, comprising using said motion vector to pre-fetch one or more adjacent macroblocks of said picture in said left view video for motion prediction for corresponding one or more adjacent macroblocks of said macroblock of said picture in said right view video.

9. A system, comprising:
    one or more processors, one or more circuits, or any combination thereof for use in a video processing system, wherein said one or more processors, said one or more circuits, or said combination thereof are operable to:
        receive compressed three-dimensional (3D) video comprising a base view video and a residual view video;
        decode said received base view video and an enhancement view video of said received compressed 3D video into a left view video and a right view video, wherein said base view video is generated by selectively producing pictures in said base view video based on available memory resource,
        wherein one or more pictures in said base view video that are not used to predict corresponding pictures in said enhancement view video are dropped based on said available memory resource.

10. The system according to claim 9, wherein said residual view video is generated by subtracting pictures in said base view video from corresponding pictures in said enhancement view video of said compressed 3D video.

11. The system according to claim 9, wherein said one or more processors, said one or more circuits, or said combinations thereof are operable to buffer said received base view video and said received residual view video.

12. The system according to claim 11, wherein said one or more processors, said one or more circuits, or said combination thereof are operable to decode said buffered base view video into said left view video, said right view video, or both left and right view videos.

13. The system according to claim 11, wherein said one or more processors, said one or more circuits, or said combination thereof are operable to produce pictures in said enhancement view video of said received compressed 3D video by adding pictures in said buffered residual view video to corresponding pictures in said buffered base view video.

14. The system according to claim 13, wherein said one or more processors, said one or more circuits, or said combination thereof are operable to decode said produced pictures in said enhancement view video into said left view video, said right view video, or both left and right view videos.

15. The system according to claim 9, wherein said one or more processors, said one or more circuits, or said combination thereof are operable to use a motion vector to fetch a macroblock of a picture in said left view video for motion prediction for a macroblock of a picture in said right view video, wherein said macroblock of said picture in said right view video is disparity predicted from said macroblock of a picture in said left view video.

16. The system according to claim 15, wherein said one or more processors, said one or more circuits, or said combinations thereof are operable to use said motion vector to pre-fetch one or more adjacent macroblocks of said picture in said left view video for motion prediction for corresponding one or more adjacent macroblocks of said macroblock of said picture in said right view video.

17. A method, comprising:
- decoding a base view video and an enhancement view video of a compressed 3D video obtained by a video reception unit into a left view video and a right view video, wherein one or more pictures in said base view video that are not used to predict corresponding pictures in said enhancement view video are dropped based on said available memory resource; and
- using a motion vector to fetch a macroblock of a picture in said left view video for motion prediction for a macroblock of a picture in said right view video, wherein said macroblock of said picture in said right view video is disparity predicted from said macroblock of a picture in said left view video.

18. The method of claim 17, further comprising using said motion vector to pre-fetch one or more adjacent macroblocks of said picture in said left view video for motion prediction for corresponding one or more adjacent macroblocks of said macroblock of said picture in said right view video.

* * * * *